Jan. 14, 1941.     E. FRYDMAN     2,228,449

CURRENT SUPPLY ARRANGEMENT FOR USE IN TELEPHONE SYSTEMS

Filed April 14, 1938

INVENTOR
EMANUEL FRYDMAN
BY
ATTORNEY

Patented Jan. 14, 1941

2,228,449

UNITED STATES PATENT OFFICE 2,228,449

CURRENT SUPPLY ARRANGEMENT FOR USE IN TELEPHONE SYSTEMS

Emanuel Frydman, Liverpool, England, assignor to Associated Telephone & Telegraph Company, Chicago, Ill., a corporation of Delaware Application April 14, 1938, Serial No. 201,899
In Great Britain May 20, 1937

7 Claims. (Cl. 171—97)

The present invention relates to current supply arrangements for telephone signalling systems and is particularly concerned with systems in which in addition to the normal operating battery potential, reverse and augmented potentials are required for signalling or metering purposes. Generally this requirement is met by the provision of a small auxiliary battery in addition to the normal main operating battery.

In small exchanges however such as are installed in rural areas the provision of another battery of the secondary cell type with the necessary charging arrangements considerably increases the prime cost while the use of dry cells for this purpose is objectionable due to the periodic replacements required. The main battery itself cannot be used for supplying potential of opposite polarity since it is desirable for other reasons for one pole to be permanently earthed. The object of the invention is to obtain an auxiliary potential from the normal operating battery by making use of a simple converting arrangement of generally known type.

According to the invention in a current supply arrangement for a small telephone exchange a potential independent of the exchange battery is obtained by the use of a plurality of large capacity condensers in conjunction with switching arrangements whereby the condensers are cyclically charged from the exchange battery and cyclically discharged to supply the required potential.

Figure 1:
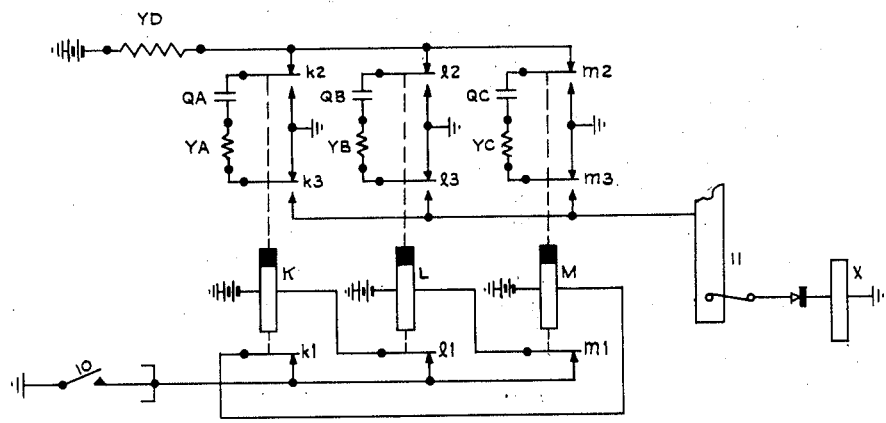
Figure 2:
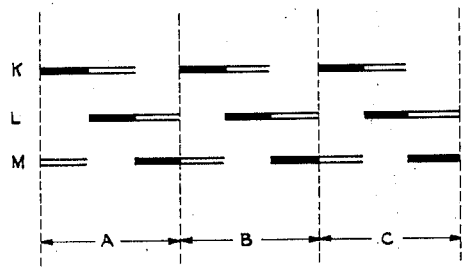

The invention will be better understood from the following description of one method of carrying it into effect, which should be taken in conjunction with the accompanying drawing comprising Figs. 1 and 2. Fig. 1 is a circuit diagram of the converting arrangement according to the invention. Fig. 2 is a time graph schematically illustrating the cyclic operation of the converting arrangement.

Referring first to Fig. 1, the three relays K, L and M are arranged in a continuous chain to operate and release in cyclic order and ensure by means of their contacts that at all times during their operation one of the condensers QA, QB and QC, which are preferably of the electrolytic type, is being charged whilst the other two are connected to a discharge circuit.

It is intended that a contact such as 10 would be closed when the special potential, in this case booster battery, was required. Thereupon the three relays K, L and M are operated and at their armatures $l1$, $m1$ and $k1$ break the energising circuits so that they commence to release and then re-operate. Each of the relays is provided with a heavy copper collar around its core; the collars, which will hereinafter be referred to as slugs, make the relays slow to release in the well-known manner. Since no two relays even if they are of identical construction and loading have precisely the same operating characteristics, it is found that after a few initial operations the relays become out of step sufficiently to settle down to a sustained cyclic operation as indicated in Fig. 2.

This shows three complete cycles of operation on the basis that a heavy single line indicates the period over which each relay is operated due to the energisation of its winding whilst a double line indicates the period over which each relay remains operated due to its slug after the disconnection of its energising circuit. It will be seen from reference to the circuit diagram of Fig. 1 that if it is assumed that a cycle commences on the release of relay L, the winding of relay K will be energised and this relay on operating quickly disconnects the energising circuit for relay M which now holds operated for a further period due to its slug. On the release of relay M, a circuit is completed to energise the winding of relay L which operates quickly and disconnects the energising circuit of relay K. On the release of this relay after its slow release period, which is substantially equal to that of relay M, the latter relay is again operated whereupon relay L commences its slow release period. On the release of relay L, relay K is again operated and the next cycle commences and carries through in the manner described.

It will be appreciated that the length of each cycle may be readily varied by altering the size or position of the slugs on the relays or by providing other means of obtaining operating or release lags.

It will be seen that during practically the whole of each cycle two relays are operated and one is normal and as a result two condensers are connected to the discharge circuit while one is being charged. For example, during the period relay L is normal, a circuit is completed to charge condenser QB from earth, armature $l3$, resistance YB, condenser QB, armature $l2$, resistance YD to the normal main battery while at the same time the charged condensers QA and QC are connected over the operated armatures of relays K and M respectively to a lead extending to a distribution bar $l1$. A typical relay X, arranged by means of a rectifier to operate on a reverse potential only, is shown by way of example connected to this bar. On the release of relay M, condenser QC is put on charge. On the operation of relay L the fully charged condenser QB is connected in parallel with condenser QA and this condition remains until relay K releases when another changeover is effected.

The cycle time is arranged to be a minimum consistent with the satisfactory charging of the condensers so that with a given continuous discharge load the condenser capacities required to maintain a predetermined range of potential will be as small as possible.

During such times as the converting arrangement is not in use, that is to say no contacts such as 10 are closed, all the condensers are charged fully over resting contacts of the relays K, L and M in readiness for the next demand.

Resistances YA to YC are of low value and are merely inserted as current limiting resistances in case a charged condenser is accidentally short-circuited by way of contacts of one of the relays K, L and M. Resistance YD is utilised to regulate the charging rate.

It will be understood that the battery symbols shown connected to the windings of relays K, L and M represent the main operating battery and are only shown separately for convenience.

I claim:

1. A current supply circuit comprising, a direct current source, a plurality of condensers, a load circuit, a series of slow acting relays, means for connecting said relays to said source to operate said relays in cyclic permutation, each relay alternately connecting a different one of said condensers to the source and to the load circuit.

2. In combination, a relay chain, each relay in said chain having a contact to control the operation of the next relay in said chain, thereby causing said chain of relays to operate continuously in cyclic permutation, a plurality of condensers, the different ones of said condensers corresponding respectively to the different ones of the relays in said chain, a source of charging current for said condensers, a discharge circuit common to all of said condensers, and contacts on each relay in said chain operated to connect the condenser corresponding to that relay alternately to said source and said discharge circuit.

3. In an energy converting arrangement, a plurality of relays, means for alternately energizing and deenergizing each said relay in such timed relationship to the energizations and deenergizations of the others of said relays that at every instant at least one of the relays is energized and at least one of the relays is deenergized, a condenser individual to each relay, a direct current source, a load circuit, and contacts on each relay connecting that relay's individual condenser to said source when the relay is in one of its positions and to said load circuit when the relay is in the other of its positions.

4. In combination, a plurality of condensers, a source of charging current for said condensers, a discharge circuit common to all of said condensers, means operated to connect said condensers to said source in cyclic permutation, said means effective also after each condenser has been charged from said source to disconnect that condenser therefrom and to connect it transitorily to said discharge circuit, said condensers thereby being connected to said discharge circuit in the same sequence as they are connected to said source, and one of said condensers always being charged from said source while another is being discharged over said circuit.

5. In an energy converting arrangement, a source of direct current, a load, a plurality of condensers, means operated to connect each said condenser alternately to said source to charge said condenser and to said load to discharge said condenser, said means effective to disconnect each condenser from said load when that condenser is connected to said source and to disconnect each condenser from said source when that condenser is connected to said load, whereby none of the condensers is at any time connected both to said source and to said load, said means controlling the alternate connection to said source and said load of all of said condensers and effective to maintain the connections of the respective condensers to said source in such timed relationship that at every instant at least one of said condensers is connected to said source.

6. In an energy converting arrangement, a source of direct current, a load, a plurality of condensers, means operated to connect each said condenser alternately to said source to charge said condenser and to said load to discharge said condenser, said means effective to disconnect each condenser from said load when that condenser is connected to said source and to disconnect each condenser from said source when that condenser is connected to said load, whereby none of the condensers is at any time connected both to said source and to said load, said means controlling the alternate connection to said source and said load of all of said condensers and effective to maintain the connections of the respective condensers to said load in such timed relationship that at every instant at least one of said condensers is connected to said load.

7. In an energy converting arrangement, a source of direct current, a load, a plurality of condensers, means operated to connect each said condenser alternately to said source to charge said condenser and to said load to discharge said condenser, said means effective to disconnect each condenser from said load when that condenser is connected to said source and to disconnect each condenser from said source when that condenser is connected to said load, whereby none of the condensers is at any time connected both to said source and to said load, said means controlling the alternate connection to said source and said load of all of said condensers and effective to maintain the connections of the respective condensers to said source and said load in such timed relationship that at every instant at least one of said condensers is connected to said source and at least one of said condensers is connected to said load.

EMANUEL FRYDMAN.